US012762181B2

(12) United States Patent
Zhang et al.

(10) Patent No.: US 12,762,181 B2
(45) Date of Patent: Oct. 13, 2026

(54) CONTENT-FIRST COLLECTION GENERATION

(71) Applicant: Pinterest, Inc., San Francisco, CA (US)

(72) Inventors: Faye Zhang, San Francisco, CA (US); Qi Wan, New York, NY (US)

(73) Assignee: Pinterest, Inc., San Francisco, CA (US)

( * ) Notice: Subject to any disclaimer, the term of this patent is extended or adjusted under 35 U.S.C. 154(b) by 0 days.

(21) Appl. No.: 19/043,408

(22) Filed: Jan. 31, 2025

(65) Prior Publication Data

US 2026/0228275 A1 Aug. 6, 2026

(51) Int. Cl.
*G06F 16/538* (2019.01)
*G06F 16/535* (2019.01)
*G06F 16/58* (2019.01)
*G06F 16/583* (2019.01)

(52) U.S. Cl.
CPC .......... *G06F 16/538* (2019.01); *G06F 16/535* (2019.01); *G06F 16/583* (2019.01); *G06F 16/5866* (2019.01)

(58) Field of Classification Search
CPC .... G06F 16/538; G06F 16/535; G06F 16/583; G06F 16/5866
See application file for complete search history.

(56) References Cited

U.S. PATENT DOCUMENTS 10,162,865 B2 * 12/2018 Yuen .................... G06F 16/587
12,254,005 B1 * 3/2025 Sinha .................... G16H 50/70
2009/0208116 A1 * 8/2009 Gokturk .............. G06F 16/5854 382/209
2010/0306249 A1 * 12/2010 Hill ........................ G06Q 10/40 707/769
2022/0292543 A1 * 9/2022 Henderson ......... G06Q 30/0252
2023/0048742 A1 * 2/2023 Mishra .................. G06F 40/284
2023/0060252 A1 * 3/2023 Bly ..................... G06F 16/9024
2024/0362409 A1 * 10/2024 Kuan ...................... G06F 40/30
2025/0148816 A1 * 5/2025 Gusarov ................ G06V 20/70
2025/0390768 A1 * 12/2025 Turrell ................... G06N 5/022

OTHER PUBLICATIONS

Cucerzan, Silviu, et al. "Query Suggestion based on User Landing Pages." Proceedings of the 30th Annual International ACM SIGIR Conference on Research and Development in Information Retrieval. 2007.

(Continued)

*Primary Examiner* — Angelica Ruiz
(74) *Attorney, Agent, or Firm* — Gustafson IP

(57) ABSTRACT

Methods, systems, and apparatus, including computer programs encoded on computer storage media, for analyzing content. One of the methods includes obtaining a collection of content items, each content item including an image and associated metadata; generating a collection of attributes for each content item by analyzing the image and the associated metadata; assigning one or more attributes to each content item; generating a plurality of queries from the collection of attributes; and populating a plurality of collections, each collection having a topic corresponding to a query, wherein populating the collections comprises evaluating a relevance of each query-content item pair based on an overlap between attributes associated with the query and attributes assigned to the content item.

20 Claims, 6 Drawing Sheets

(56) References Cited

OTHER PUBLICATIONS

Goenka, Sonam, et al. "FashionVLP: Vision Language Transformer for Fashion Retrieval with Feedback." Proceedings of the IEEE/CVF Conference on Computer Vision and Pattern Recognition. 2022.
Hirakawa, Yuki, et al. "An Empirical Analysis of GPT-4V's Performance on Fashion Aesthetic Evaluation." SIGGRAPH Asia 2024 Technical Communications. 2024.
Jie, Cheng, et al. "Deep Learning Based Page Creation for Improving E-Commerce Organic Search Traffic." arXiv preprint arXiv:2209.10792. 2022.
Khalil, Mahmoud, et al. "A Comprehensive Study of Vision Transformers in Image Classification Tasks". arXiv preprint arXiv:2312.01232. 2023.
Radford, Alec, et al. "Learning Transferable Visual Models From Natural Language Supervision." International Conference on Machine Learning. arXiv:2103.00020v1. 2021.

* cited by examiner

CONTENT-FIRST COLLECTION GENERATION

BACKGROUND

Technical Field

This specification relates to analyzing content for content discovery.

Background

Digital landing pages can refer to content presented in response to queries. Keyword landing pages typically refer to topic-centered collection pages that serve, for example, as entry points for content discovery.

Conventionally, keyword landing pages are generated by using popular search queries to identify potential topics for landing pages. Then internal search systems using those queries can generate results used to populate content for the landing pages. The conventional process for generating keyword landing pages can have limited topical coverage because the process only covers topics users are actively searching. Additionally, the internal search systems can lack the precision needed for curated landing pages where the populated content is highly relevant to the topic.

SUMMARY

This specification describes technologies for generating topical collections at scale using a content-first approach. These technologies generally involve generating attributes from a collection of content. The generated attributes are further refined using content matching to assign attributes to individual content items. Using the refined attributes, a collection of queries are generated. The queries and content items are then used to populate topical collections of content items.

In particular, the collection of content can include individual content items each having an image and associated metadata. Attributes can be generated for each image. For example, a vision-language model can be used to generate attributes for the images. Attributes can be further processed to filter infrequently occurring attributes and duplicates. The processed attributes can be used to train a content matching model that is used to assign a set of attributes to each image in the collection.

Using the attributes, the query generation transforms attribute combinations into natural language queries that can be used as collection titles or topics for keyword landing pages. Based on the attributes associated with the queries and the attributes assigned to the images, collections of content can be populated for each keyword landing page.

In general, one innovative aspect of the subject matter described in this specification can be embodied in methods that include the actions of obtaining a collection of content items, each content item including an image and associated metadata; generating a collection of attributes for each content item by analyzing the image and the associated metadata; assigning one or more attributes to each content item; generating a plurality of queries from the collection of attributes; and populating a plurality of collections, each collection having a topic corresponding to a query, wherein populating the collections comprises evaluating a relevance of each query-content item pair based on an overlap between attributes associated with the query and attributes assigned to the content item.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

These and other implementations can each optionally include one or more of the following features. Content matching is used to assign the one or more attributes to each content item, the content matching includes: learning one or more functions that map content items and attributes to a shared embedding space; and for each content item and attribute, identifying relevant attributes for assignment to the content items by computing a similarity between the functions. The method further includes assigning the one or more attributes using a content matching model, wherein using the content matching model includes: for each content item: determining, by an image encoder, an image embedding for image content of the content item; determining, by a first text encoder, a first text embedding for textual content of the content item; and generating a combined embedding for the content item by combining the image embedding and the first text embedding; for the collection of attributes, determining, by a second text encoder, a second text embedding for each attribute; computing a similarity measure relating each content item and attribute pair; and assigning a particular attribute to a particular content item if the similarity measure satisfies a threshold value. Training the content matching model includes: adding a weight value to each attribute based on a frequency of occurrence of the attribute in training data. Generating a query includes: combining a specified number of attributes from the collection of attributes; and transforming, by a machine learning model, the combination of attributes into one or more queries. Generating the collection of attributes includes: providing each content item of the collection of content items to a vision-language model that is trained to extract attributes across a specified set of domain specific categories. The method further includes: filtering the extracted set of attributes before performing content matching, the filtering comprising one or more of frequency filtering or semantic deduplications.

The subject matter described in this specification can be implemented in particular embodiments so as to realize one or more of the following advantages. Using a content-first approach rather than a query-first approach allows for broader coverage of a content collection and improves the precision of generated collections of content. The technologies described in this specification do not require predefined attribute hierarchies or manual curation of collections. Using content matching for assigning attributes to content items provides consistent attribute assignment.

As compared to conventional techniques, keyword landing pages can be generated much faster while maintaining or even improving precision of the association of the content of the keyword landing pages to a corresponding topic. For example, search query-based techniques require time to collect user queries before generating keyword landing pages. By contrast, by generating keyword landing pages from the content itself, this time to collect search queries is eliminated.

The technologies allow for the creation of a pipeline that can be used to generate keyword landing pages for different domains without requiring predefined taxonomies or historical user data.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Generating collections of content that correspond to keyword landing pages for topics is performed using a content-first approach. This means that rather than starting with a set of historical queries to identify topics for landing pages, the content is directly analyzed to generate queries corresponding to collection topics and populate the collections with content. A keyword landing page is a particular user interface, for example a web page, that is associated with one or more keywords and typically populated with related content. The keyword landing page can be presented, for example, in response to a query or in response to the selection of a resource on a different user interface, e.g., containing a hyperlink to the keyword landing page. This specification describes a multi-stage pipeline combining attribute extraction, content matching, and topic generation.

Figure 1:
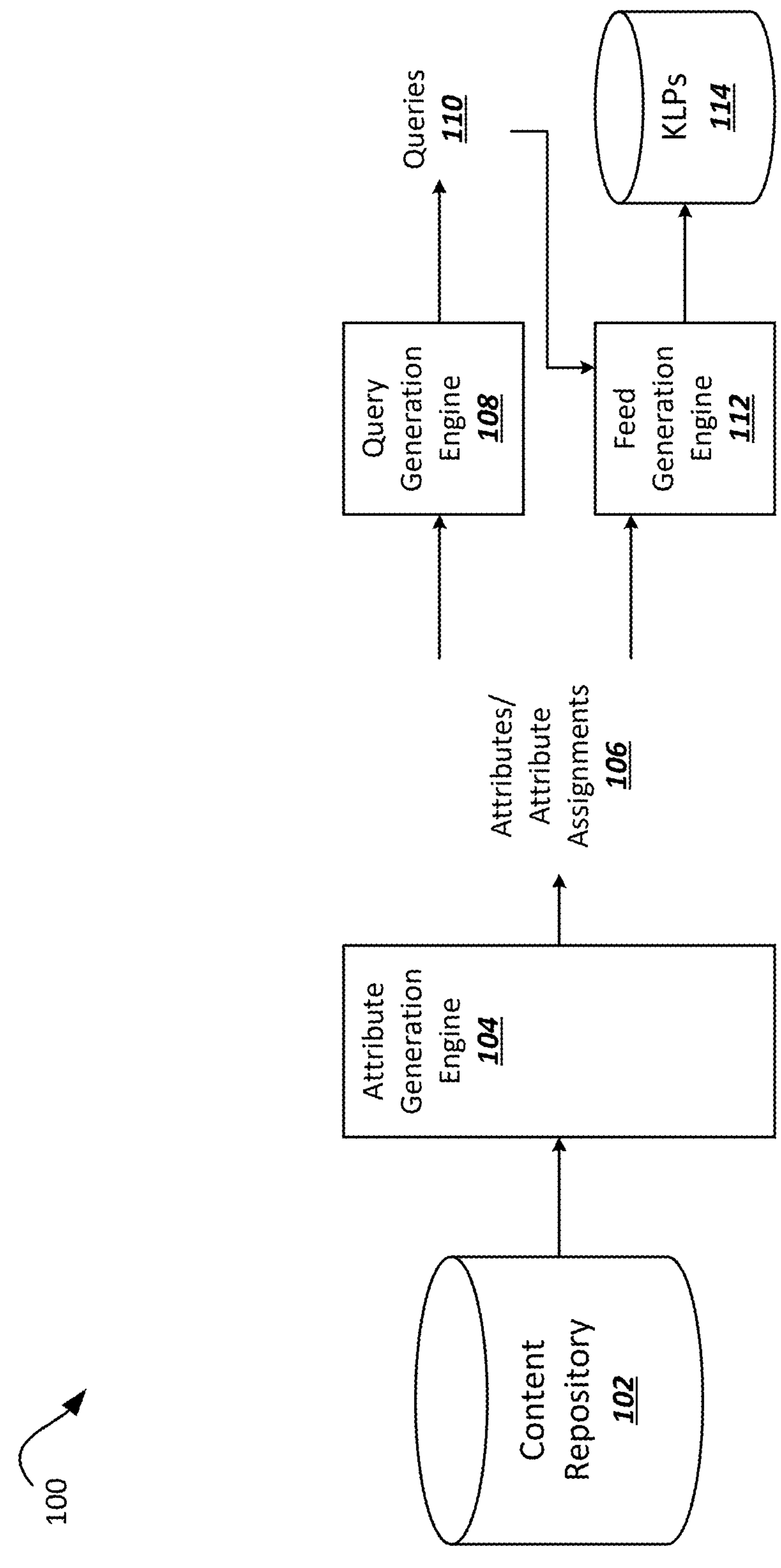
FIG. 1 is a diagram of an example pipeline for generating collections.

FIG. 1 is a diagram of an example pipeline 100 for generating topical content collections. The pipeline 100 includes a content repository 102. The content repository 102 can include a collection of content items, e.g., images, and associated metadata. For example, each image can have associated metadata including a name/title of the image, a text description of the image content, one or more third party tags, etc. Third party tags can include descriptors of content in the image. In some instances, the metadata further includes merchant information such as a price associated with content shown in the image (or an item within the image), for example, when the image represents a product such as an article of clothing or a piece of furniture.

The content repository 102 can include a large collection of content items numbering in the hundreds of thousands or more. For example, in some implementations, the content repository includes several hundred thousand images corresponding to different products across apparel, accessories, and footwear categories. Each product is characterized by multimodal content including product images and metadata such as title, description, price, and tags provided by image creators.

The content repository 102 can be formed from any suitable hardware storage including single data store or a distributed storage. The content repository can be a general collection of content items used as part of a larger system for example an image recommendation or social media platform. Alternatively, a separate set of content items can be collected for use in assembling keyword landing pages, for example, only images that satisfy a particular domain and other criteria, e.g., only sponsored content items belonging to the domain.

The pipeline 100 includes an attribute generation engine 104 that extracts attributes from images in the content repository 102 using the images and the corresponding image metadata. As described in greater detail below with respect to FIG. 2, a vision-language model ("V-LM") may be used to generate structured attributes from the content items in the content repository. The generated attributes can be filtered and refined to train a content matching model to assign each image with a corresponding set of attributes.

The attribute generation engine 104 outputs a set of attributes 106. In addition to a set of attributes determined from the content items in the content repository, the attribute generation engine 104 also assigns attributes to each content item of the content repository. Thus, for each image of the content repository, an output set of matched attributes are assigned for the image. The attributes and attribute assignment data can be stored in a data repository.

The pipeline 100 includes a query generation engine 108. The query generation engine 108 transforms attribute combinations into natural language queries 110. The natural language queries 110 can be used as collection titles for keyword landing pages, e.g., defining the topic associated with each keyword landing page. The query generation engine 108 uses combinations of attributes generated by the attribute generation engine 104 to form the natural language queries. For example, from the attribute set-season: summer; color: yellow; type: dress; occasion: party, the query generation can provide a collection title of "Summer yellow dress for parties." The resulting collection keyword landing page topics provide a natural and searchable entry point for content discovery.

The pipeline 100 includes feed generation engine 112. The feed generation engine 112 uses attribute-based matching to generate content for populating keyword landing pages 114. Each keyword landing page 114 has a query for a title/topic and is associated with a set of images identified by the feed generation engine. Specifically, candidate images determined through a measure of attribute similarity between a query and images can be ranked. A specified number of top ranked images can then be selected for inclusion in the keyword landing page. The keyword landing page can be stored, for example, as a data structure identifying the topic of the collection and identifiers for each image selected for inclusion in the keyword landing page.

In response to particular user actions, the keyword landing page can be provided to a client device for presentation. For example, in response to a particular query that matches the topic of the keyword landing page or in response to a user interaction with other content that is associated with the keyword landing page. The keyword landing page can be provided as part of a user interface presented to the user. The keyword landing page can be rendered by retrieving each image, e.g., from a content repository, according to the set of image identifiers included in the keyword landing page.

The pipeline 100 may be a single system or a combination of separate systems. For example, attribute generation may be performed by a first system while query generation and collection generation may be performed by one or more other systems.

Figure 2:
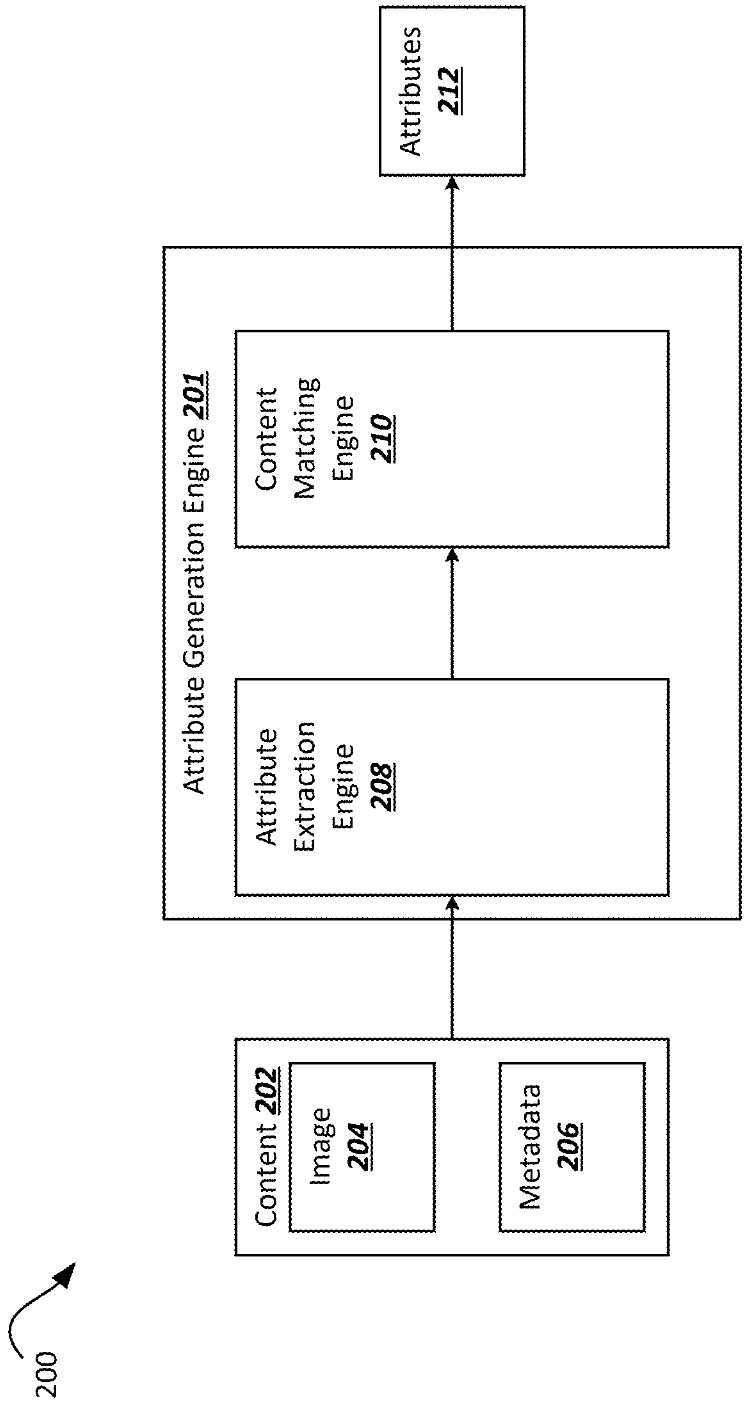
FIG. 2 is a diagram of an example pipeline for generating attributes.

FIG. 2 is a diagram of an example pipeline 200 for generating attributes. Pipeline 200 includes an attribute generation engine 201 that can be similar to the attribution generation engine 104 of FIG. 1. The attribute generation engine 201 includes an attribute extraction engine 208 and a content matching engine 210.

The attribute extraction engine 208 processes received content 202 to generate an initial set of attributes. The content 202 includes image content 204 and associated metadata 206.

The attribute extraction engine 208 can use a machine learning model to extract attributes. An example machine learning model is a V-LM that is configured to integrate visual analysis into a large language model to generate structured attributes from a diverse set of images. Large Language Models (LLMs) are a class of machine learning models designed to understand and generate human-like text based on vast amounts of data. These models are built using deep learning techniques, particularly variants of recurrent neural networks (RNNs) or transformer architectures. LLMs are used for various natural language processing tasks, including text generation, translation, summarization, sentiment analysis, question answering, and more.

A V-LM is a multimodal model that allows users to ask questions about the content of images. V-LMs are used, for example, to identify objects in images, interpret data from visual representations like graphs and charts, as well as reading images of textual documents e.g., handwritten materials.

Using the pairs of images and metadata for each content item, the V-LM extracts structured attributes across a specified set of categories. In some implementations, the V-LM encompasses a hierarchy of categories. The hierarchy can include, for example, broad categories, e.g., apparel; subcategories, e.g., dresses; and specific types, e.g., Maxi Dresses.

The categories can depend on the domain of the content the system is used to analyze. For example, for images that correspond to clothes, the categories can include, for example, type, color, material, style, and occasion. Type can refer to the type of article of clothing e.g., dress, shirt. Style can refer to, for example, "formal" or "casual". Occasion can be, for example, "cocktail" or "party".

Categories for other types of applications and across different domains can be different. The categories can be selected to capture key features of the collection of content. For example, a collection of images of home decor items can have a different set of categories aligned with the application of the system and the types of attributes of interest. Example categories and attributes for a home décor domain can include:

Room: Living room, bedroom, kitchen, bathroom, etc.
Style: Scandinavian, industrial, farmhouse, modern, etc.
Color Scheme: Neutral, vibrant, monochrome, pastel.
Furniture Type: Sofa, bed, dining table, chairs, etc.
Materials: Wood, metal, glass, fabric, etc.
Accessories: Rugs, lamps, artwork, cushions, etc.
Size/Layout: Small spaces, open-plan, minimalist, etc.

Similarly, example categories and attributes for a beauty domain can include:

Product Type: Skincare, makeup, haircare, fragrances.
Brand: Specific beauty brands.
Skin Type: Oily, dry, combination, sensitive.
Concerns: Acne, aging, hydration, etc.
Ingredients: Natural, organic, specific active ingredients.
Tutorials: How-to guides, application techniques.
Trends: Current beauty trends, seasonal looks.

A further example for a travel domain includes;

Type of Travel: Adventure, relaxation, cultural, solo, family.
Accommodation: Hotels, hostels, Airbnb, resorts.
Activities: Sightseeing, hiking, beach activities, etc.
Budget: Budget-friendly, luxury, mid-range.
Season: Best time to visit, seasonal attractions,
Duration: Weekend trips, week-long vacations, extended stays.

As an illustrative example, a content item can include an image of a green silk dress. The associated metadata can include various information about the dress added, for example, by the creator of the image. For example, the metadata for the green dress can include: "100% silk dress, emerald green, $155.78. Feel effortless in our emerald green mini dress." The attribute extraction performed by the attribute extraction engine 208 can result in the following structured category/attribute output:

Type: dress
Material: silk
Shape: v-neck, cuff sleeves, . . .
. . .
Occasion: evening, cocktail, formal events.

Although the V-LM generates relevant attributes from each image, further refinement can be performed by the content matching engine 210 to generate a final set of attributes for each image 212. The V-LM may generate overly specific or granular attributes that are less useful for organizing topical collections. For example, the attribute "black insoles" for footwear may be too specific. Additionally, the V-LM model may generate variations of semantically equivalent attributes, e.g., casual vs. daywear, creating redundancy in the attribute set. Further, in some implementations, human oversight may be used to identify biases generated by the model. However, the large volume of attributes may be infeasible for human bias evaluation for a large collection of images.

The content matching engine 210 processes the model outputs through attribute curation and model training. The attribute curation includes performing one or more filtering processes on the initial attribute set. These filtering processes can reduce redundancies and uncommon attributes.

Frequency-based filtering can be used to filter the initial attribute set based on occurrence frequency of the attributes. This allows the system to identify commonly used descriptors and remove rare or unusual attributes that provide limited value in collection creation. For example, for a collection of images the frequency count of each attribute extracted from an image can be obtained. A frequency threshold value can be used as a filter to cut attributes that do not satisfy the frequency threshold value.

Identifying and filtering for semantic deduplication can reduce the redundancy of attributes that have semantically similar or equivalent meanings. For example, for clothes, the attributes "casual" and "everyday" can be semantically equivalent. Different techniques can be used to identify semantically similar attributes. One technique is to apply a transformer machine learning architecture such as bidirectional encoder representations from transformers "BERT" to measure the pairwise semantic similarity between a pair of attributes. For attributes having a semantic similarity that satisfies a threshold, the member of the pair retained in the attribute set can be the one having a higher occurrence frequency.

Other suitable techniques can be used to evaluate a semantic similarity between attributes. These include embedding-based techniques such as static word to vector ("word2vec") or global vectors ("GloVe") embedding with cosine similarity and contextualized embedding models using, for example, an LLM to generate context-aware embeddings. Other suitable techniques can include knowledge graph-based techniques such as ConceptNet, which is a semantic network that captures relationships between words and phrases. Other suitable techniques can also include clustering-based techniques such as hierarchical clustering or K-means clustering.

In some implementations, human experts and/or machine learning systems, e.g., large language models, can be used to review attributes for quality and appropriateness. This can be performed to mitigate potential biases in the attribute set particular in terms of human-related descriptions as well as maintaining product safety standards for items depicted in the image collection. In some implementations, the LLM can be provided with detailed prompts that include specific rules and illustrative examples to guide the LLM in identifying potentially biased attributes. Human reviewers can be used to manually evaluate potentially biased attributes identified by the LLM.

The filtered set of attributes and the corresponding images are used by the content matching engine 210 to train a content matching model. Specifically, the attributes and corresponding images provide ground-truth training data for training the content matching model. The objective of a content matching model is to learn functions that map images and attributes to a shared embedding space such that the similarity measure is high for correct image-attribute pairs and low for incorrect image-attribute pairs.

For example, each image can depict a particular product. This can be represented as a set of products $P=\{p_1, p_2, \ldots, p_n\}$ where each product is represented by an image $x_i$ and a text description $t_i$. Additionally, the set of candidate attributes can be denoted by $A=\{a_1, a_2, \ldots, a_m\}$. The content matching task is to learn functions $f$ and g that map products and attributes into the shared embedding space such that:

$$f:(x,t)\to\mathbb{R}^d,\ g:a\to\mathbb{R}^d,$$

This ensures that the similarity between the functions represented by $\mathrm{sim}(f(x_i, t_i), g(a_j)$ is high for correct product-attribute pairs and low for incorrect pairs.

In some implementations, the content matching model is based on a Contrastive Language-Image Pre-training ("CLIP") architecture. CLIP is a model that learns visual concepts from natural language descriptions. CLIP uses contrastive pre-training of the model. Contrastive training is a technique that teaches a model to recognize similarities and differences in a large set of image data based on training data that represents both positive and negative examples.

The CLIP model uses dual text and visual encoders to map images and text to a shared embedding space. A vision transformer is an encoder that extracts salient features from visual input. For an input image, a vector representation of the image can be generated that encodes the extracted features. The vision transformer can be based on a convolutional neural network architecture. The text transformer is an encoder that encodes the semantic meaning of an input textual description. For example, an image label or caption can be encoded as a vector representation. The text transformer can be based on a transformer-based architecture.

The vision and text encoders produce embeddings in a shared vector space. These shared embedding spaces allow CLIP to evaluate the corresponding text and image representations and learn their underlying relationships.

The CLIP architecture is adapted from the dual-encoder architecture designed for multimodal representation learning to a triple-encoder architecture that processes images, text, and attributes. The CLIP architecture is adapted for product-attribute matching as illustrated in FIG. 3.

Figure 3:
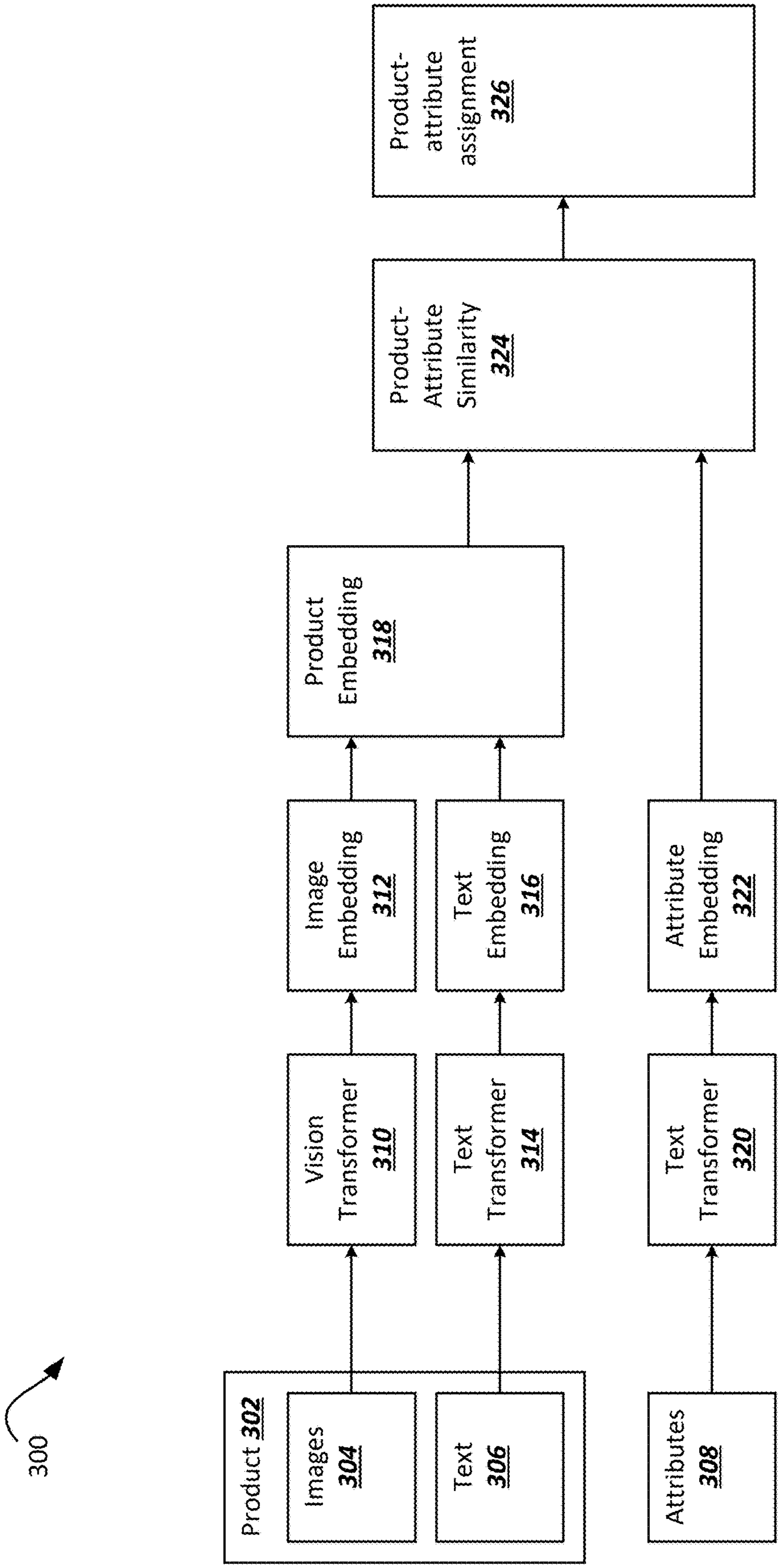
FIG. 3 is a diagram illustrating a content matching architecture.

FIG. 3 is a diagram illustrating a content matching model architecture 300. The content matching architecture 300 is illustrated with respect to input products as content items. In other implementations different types of content items can be used without changing the architecture 300. Each product 302 is represented by an image 304 and a text description 306, e.g., the metadata described above. The product is matched to one or more textual attributes 308, e.g., the extracted attributes after filtering for one or more of frequency, semantic deduplication, and bias as described above.

Each product image $x_i$ is processed using a vision transformer 310 to generate an image embedding $f_{img}(x_i)$ 312. In some implementations, the vision transformer features 32 transformer layers with a hidden dimension of 1,280 configured with a 14×14 patch embedding and a stride of 14. Similarly, each product text description $t_i$ is encoded using a text transformer 314 to generate a text embedding $f_{text}(t_i)$ 316. In some implementations, the text transformer features 24 transformer layers with a hidden dimension of 1,024 using a token embedding vocabulary of 32,100 tokens and a maximum sequence length of 77 tokens.

The image embedding 312 and the text embedding 316 are combined to form a unified product embedding 318, which can be represented as:

$$f(x_i, t_i) = f_{img}(x_i) + f_{text}(t_i)$$

The attributes 308 are separately encoded using a second text transformer 320 to generate an attribute embedding $g(a_j)$ 322.

The product embedding and the attribute embedding are used to determine similarity measures between attributes and products. During inference of the model 324, an attribute is predicted to be associated with a product if their similarity satisfies a specified threshold. Consequently, for each product image, a set of relevant attributes 326 are identified and assigned to the product. Specifically, an attribute $a_j \in A$ is associated with a product $p_i \in P$ if their similarity satisfies threshold θ. This results in relevant attributes $R_i$ where R_i={a_j∈A|sim(f(x_i,t_i), g(a_j))≥θ}.

Each of the transformers, image and text, can be initialized with pretrained weights from CLIP's image and text encoders. Alternatively, the weights can be determined through the model training using the training set.

In some implementations, the model is trained using a bidirectional contrastive loss to align matching product-attribute pairs while separating mismatched pairs. The loss function can be defined as:

$$L = \sum_i \left[ -\frac{\log \exp\left(\frac{sim(f(x_i, t_i), g(a_i^*))}{\tau}\right)}{\sum_j \exp\left(\frac{sim(f(x_i, t_i), g(a_j))}{\tau}\right)} \right]$$

Where $a_i^*$ is the correct attribute for product i in the training data, sim(-,-) denotes a similarity metric, for example cosine similarity, and t is a temperature scaling parameter. The loss function encourages the model to maximize the similarity between the product embedding $f(x_i, t_i)$ and its matching attribute embedding $$g(a_i^*),$$

while minimizing similarities with non-matching attributes $g(a_j)$. As a result, the model effectively captures and differentiates relationships between products and attributes.

While CLIP based models have been shown to handle long tailed training data robustly, this can lead to overemphasis of predictions for product-attribute relationships in the training data. As a result, common attributes like "color: white" are often underweighted in similarity scores with relevant products while some rare attributes like "details: embroidered hem" are overweighted.

To address this emphasis mismatch, a weight $w_j$ is applied for each attributed j based on a frequency of the attribute j in the training data, which adjusts the similarity score $s_{ij}$. The weight can be defined as:

$$w_j = a + b \cdot \text{frequency}_j^{0.5}$$

Where a=1 and b=0.01 (heuristically chosen). The exponent 0.5 is used to apply a sublinear scaling to the frequency, ensuring that the adjustment accounts for the magnitude of the frequency differences while avoiding an excessive bias toward highly frequency attributes. The adjusted similarity score is then computed as:

$$s'_{ij} = w_j \cdot s_{ij} = w_j \cdot sim(f(x_i, t_i), g(a_j)).$$

This approach ensures that the adjusted predictions better align with the original frequency distribution of the attributes while retaining the integrity of the similarity computation.

The set of relevant attributes assigned to each image (or content in each image) can be used for query and collection generation.

Figure 4:
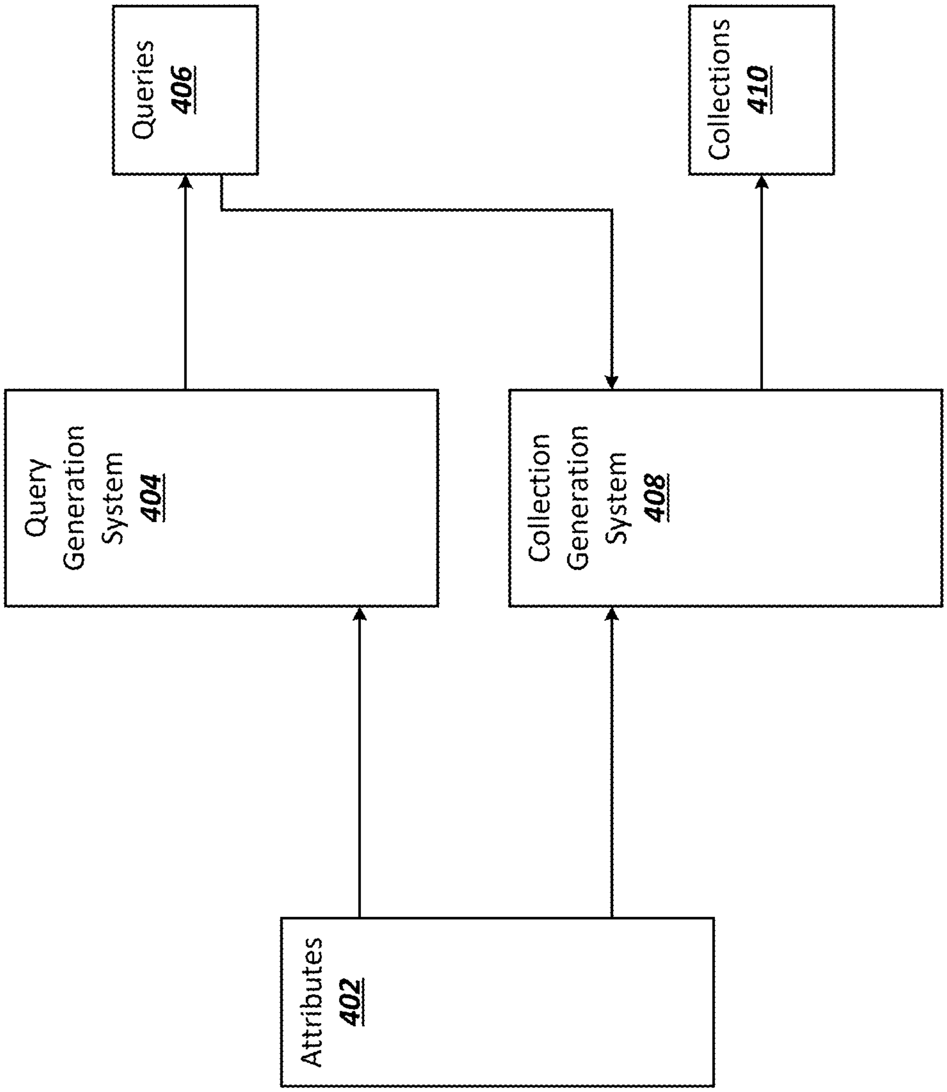
FIG. 4 is a diagram of an example pipeline for query and collection generation.

FIG. 4 is a diagram of an example pipeline for query and collection generation 400. Attributes 402 include the set of filtered attributes as well as the content matched assignments of attributes to images of the collection of content. The attributes 402 are provided to a query generation system 404 and a collection generation system 408.

The query generation system 404 uses the attributes 402 to generate a collection of queries 406. In particular, the query generation system 404 transforms combinations of attributes from the set of filtered attributes into natural language queries. The natural language queries can be used as topics for knowledge landing pages. For example, a combination of attributes—season: summer, color: yellow, type: dress, occasion: party and be used to generate the topic for a knowledge landing page of "summer yellow dress for parties."

The use of natural language queries as topics for collections can provide a natural and searchable entry point for content discovery by users. In some implementations, three to four attributes are combined to form queries. These attribute combinations can be input into a machine learning system that transforms the attribute combinations into coherent queries. Table 1 illustrates examples of query variations generated from particular attributes.

TABLE 1

| Attribute | Generated Query Variations |
|---|---|
| Material: Silk | "Luxury Silk Evening Gowns"<br>"Washable Silk Pajama Set"<br>"Silk Hair Scrunchies" |
| Occasion: Party | "Glamourous Birthday Party Dresses"<br>"Garden Party Summer Hat"<br>"Halloween Party Costume" |
| Style: Casual | "Casual Beach Cover Ups"<br>"Everyday Work Backpack"<br>"Casual Slip-on Walking Shoes" |

In some implementations, a large language model ("LLM") is used to transform attribute combinations into coherent queries. The LLM performs as both a query generator and a judge to ensure quality and relevance through semantic validation, query synthesis, and quality assessment.

During semantic validation, the system evaluates the semantic validity of attribute combinations to eliminate redundancies, conflicts, or any combinations that result in grammatically incorrect descriptions. For example, the attribute combination "round ring" can be avoided since rings are inherently round.

During query synthesis, the system generates concise, natural queries that align with search patterns. Typically, there are patterns to searches that reflect a natural language organization. For example, "Black long Sleeve Dress for New Year's Eve" instead of "Dress Long Sleeve Black New Year's Eve."

During quality assessment, the system scores generated queries, e.g., on a scale of 1 to 5, based on anticipated searchability and commonality. The scores can be used to filter out overly specific or unnatural combinations, e.g., "heavy wool sweater for summer."

To generate consistent high-quality queries, a prompt strategy can be used that guides the model in maintaining semantic validity while producing suitable natural language queries for use as collection topics. The prompt strategy can include diverse examples that demonstrate valid and invalid attribute combinations, quality scoring criteria with examples spanning the full scoring range, and/or natural language variations for different attribute combinations.

In addition, the generated queries can undergo one or more filtering processes. For example, queries can be filtered based on semantic validation. The system removes queries with invalid grammar or attribute combinations. The queries can also be filtered based on searchability. The system can retain only queries with searchability scores that exceed a specified threshold value. The filtering ensures that only high-quality semantically valid queries with adequate content coverage are used as topics for keyword landing pages.

The collection generation system 408 uses the attributes assigned to individual images and the queries to generate collections of images associated with a corresponding topic.

Thus, for each query, a corresponding collection of images can be populated that match the query derived topic of the collection. The system uses an attribute-based matching algorithm to calculate a relevance score for each pair of query and image content. Specifically, each query is associated with attributes as described above with respect to query generations. Additionally, during the content matching described above with respect to FIG. 3, each image has a set of assigned attributes. As a result, the degree of overlap between the attributes of the query and the image can be compared to measure relevance of the image to the query.

Based on the calculated relevance, an image can be added to the collection for the query. For example, the relevance score can be calculated based on attribute overlap:

$$\text{relevance}(q, p) = \sum\nolimits_{a \in A_q \cap A_p} \text{score}(a)$$

Where $A_q$ and $A_p$ are the attribute sets of query q and image p, respectively, and score(a) represents the confidence score of attribute a. The confidence score is output by the content matching model indicating the confidence of the assignment of a particular attribute to an image.

In some implementations, a distributed processing framework such as APACHE SPARK can be used to implement the attribute-based matching and identify candidate images for each collection. SPARK is a parallel data processing framework for data analytics. SPARK provides a distributed computation architecture for processing large numbers of attributes across a collection of query-image pairs. Other suitable distributed data processing architectures can be used.

To process large-scale matching efficiently, the system can implement one or more processes that reduce processing time while maintaining precision. Additionally, the system can ensure collection quality by requiring a minimum collection size for each collection, e.g., 20 images, enforcing relevance score thresholds, and validating product trust criteria. The optimizations include attribute score caching, batch processing, and memory management. The attribute score caching precomputes a mapping of attributes to confidence scores. The attribute mappings are stored in a distributed cache and redundant score computations are eliminated. The batch processing groups images by shared attributes to reduce computations. The candidates are pre-filtered using attribute occurrence thresholds. The system maintains join operations through data partitions. The memory management can include caching frequency accessed attribute mappings, implementing efficient data structures for attribute lookup, and maintaining shuffle operations in distributed processing.

Figure 5:
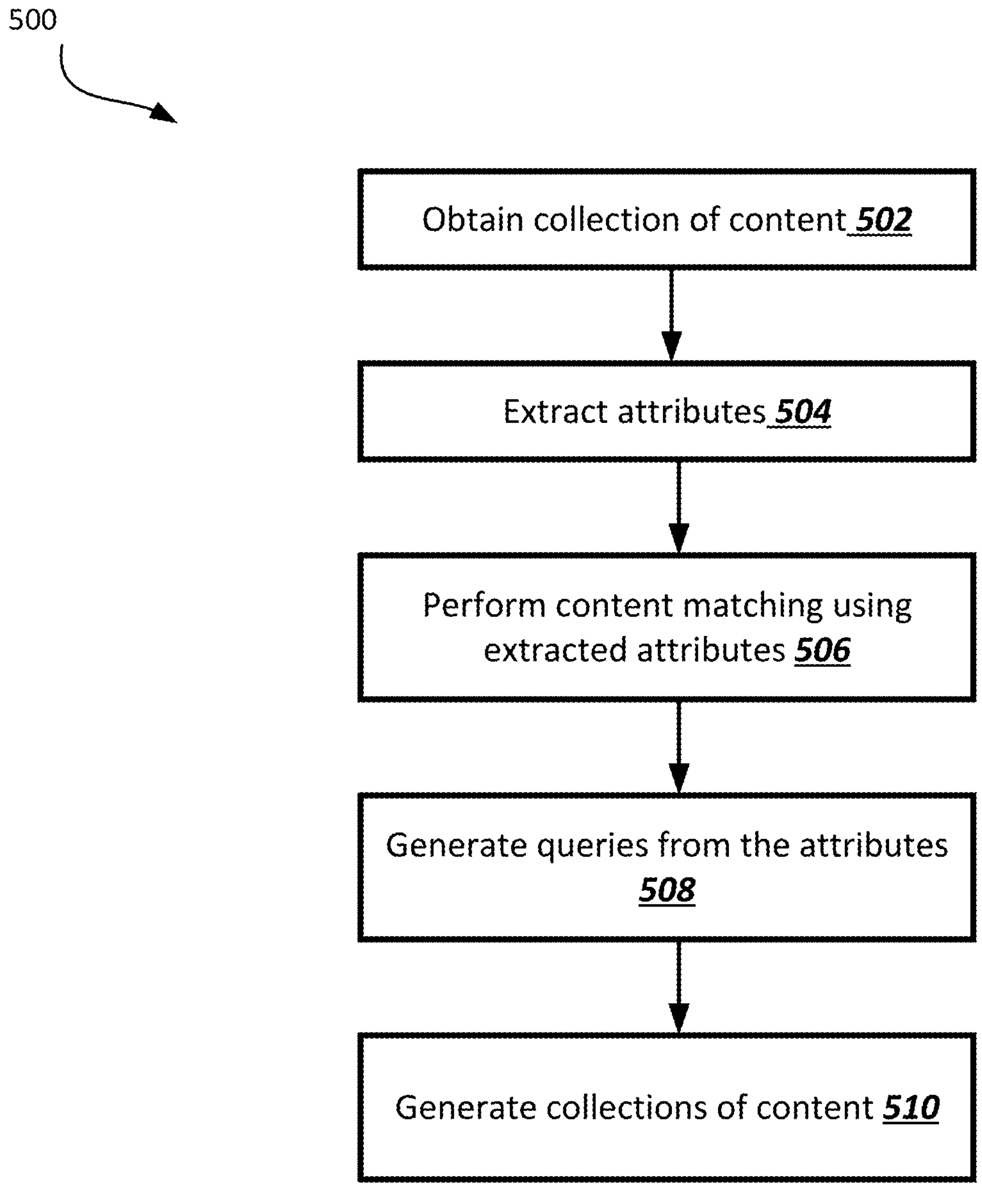
FIG. 5 is a flow diagram of an example process of collection generation.

FIG. 5 is a flow diagram of an example process 500 of collection generation. For convenience, the process 500 will be described as being performed by a system of one or more computers, located in one or more locations, and programmed appropriately in accordance with this specification. For example, a system, e.g., implementing the pipeline 100 of FIG. 1, appropriately programmed, can perform the process 500.

The system obtains a collection of content (502). The collection of content can include a collection of content items. Each content item can include an image and metadata associated with the image.

The system extracts attributes from the collection of content (504). For each item of content, e.g., each image with its associated metadata, attributes are extracted for one or more specified categories.

The system performs content matching using the extracted attributes (506). The content matching can use a model that uses the content, e.g., images, text associated with the content, and the set of extracted attributes to assign a set of one or more relevant attributes to each item of content. In some implementations, the extracted attributes are filtered according to one or more criteria including, for example, attribute frequency, semantic deduplication, and bias mitigation.

The system generates queries from the attributes (508). The query generation transforms combinations of attributes into natural language queries. The natural language queries can be used as titles or topics for keyword landing pages. A LLM can be used to generate queries from combinations of attributes. The LLM can be provided with multiple prompt examples to guide the LLM query generation.

The system generates collections of content (510). In particular, content items are identified to populate keyword landing pages determined from the generated queries. Content items for a given collection can be determined based on a matching process that determines relevance scores for each query-content item pair. The relevance score can reflect a degree of attribute overlap between the query and the content item. Content items that satisfy a threshold relevance can be added to the collection corresponding to the query.

Figure 6:
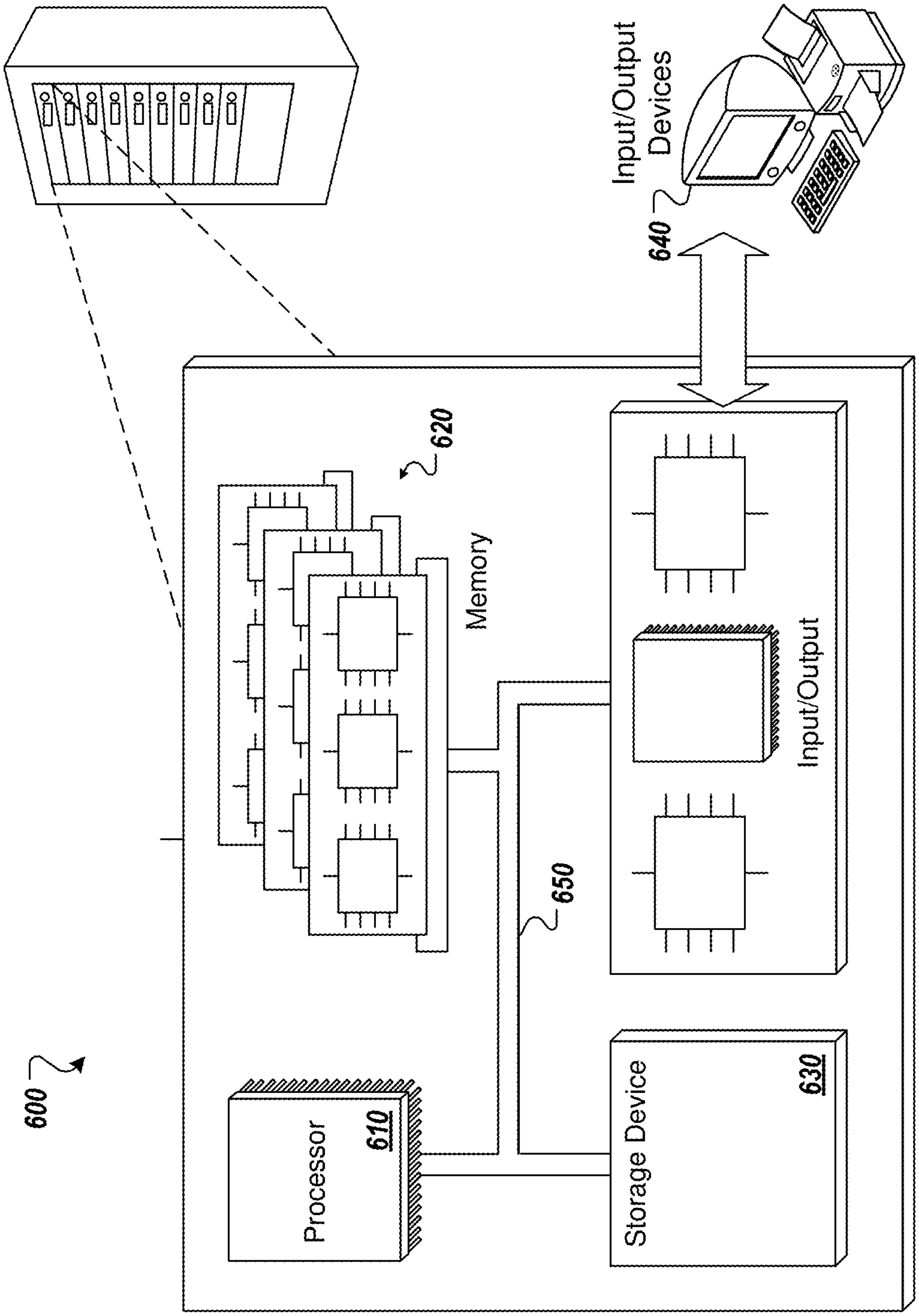
FIG. 6 is an example computing system.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In some implementations, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In some implementations, the memory 620 is a volatile memory unit. In another implementation, the memory 620 is a non-volatile memory unit.

The storage device 630 is capable of providing mass storage for the system 600. In some implementations, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In some implementations, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

In this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

obtaining a collection of content items, one or more of the content items including an image and associated metadata;

generating a collection of attributes for one or more content items of the collection of content items by analyzing the image and the associated metadata, the generating including extracting attributes from one or more content items using a vision language model trained to generate structured attributes from content items and associated metadata;

assigning one or more attributes to one or more content items;

generating, using a machine learning model, a plurality of queries as a model output from an input comprising the collection of attributes; and populating a plurality of collections of content items, one or more of the collections having a topic corresponding to one of the generated plurality of queries, wherein populating the collections comprises evaluating a relevance of query-content item pairs based on an overlap between attributes associated with the query and attributes assigned to the content item.

2. The method of claim 1, wherein content matching is used to assign the one or more attributes to the one or more content items, the content matching comprising:

learning one or more functions that map content items and attributes to a shared embedding space; and for the one or more content items, identifying relevant attributes for assignment to the content items by computing a similarity between the functions.

3. The method of claim 2, further comprising assigning the one or more attributes using a content matching model, wherein using the content matching model comprises:

for the one or more content items:

determining, by an image encoder, an image embedding for image content of the content item;

determining, by a first text encoder, a first text embedding for textual content of the content item; and generating a combined embedding for the content item by combining the image embedding and the first text embedding;

for the collection of attributes, determining, by a second text encoder, a second text embedding for each attribute;

computing a similarity measure relating respective content item and attribute pairs; and assigning a particular attribute to a particular content item if the similarity measure satisfies a threshold value.

4. The method of claim 3, wherein training the content matching model comprises:

adding a weight value to one or more attributes based on a frequency of occurrence of the attribute in training data.

5. The method of claim 1, wherein generating a query comprises:

combining a specified number of attributes from the collection of attributes; and transforming, by a machine learning model, the combination of attributes into one or more queries.

6. The method of claim 1, wherein generating the collection of attributes comprises:

providing one or more content items of the collection of content items to the vision-language model that is trained to extract attributes across a specified set of domain specific categories.

7. The method of claim 6, further comprising:

filtering the extracted set of attributes before performing content matching, the filtering comprising one or more of frequency filtering or semantic deduplications.

8. A system comprising:

one or more computers and one or more storage devices storing instructions that are operable, when executed by the one or more computers, to cause the one or more computers to perform operations comprising:

obtaining a collection of content items, one or more of the content items including an image and associated metadata;

generating a collection of attributes for one or more content items of the collection of content items by analyzing the image and the associated metadata, the generating including extracting attributes from one or more content items using a vision language model trained to generate structured attributes from content items and associated metadata;

assigning one or more attributes to one or more content item;

generating, using a machine learning model, a plurality of queries as a model output from an input comprising the collection of attributes; and populating a plurality of collections of content items, one or more of the collections having a topic corresponding to one of the generated plurality of queries, wherein populating the collections comprises evaluating a relevance of each query-content item pairs based on an overlap between attributes associated with the query and attributes assigned to the content item.

9. The system of claim 8, wherein content matching is used to assign the one or more attributes to the one or more content items, the content matching comprising:

learning one or more functions that map content items and attributes to a shared embedding space; and for the one or more content items, identifying relevant attributes for assignment to the content items by computing a similarity between the functions.

10. The system of claim 9, further comprising assigning the one or more attributes using a content matching model, wherein using the content matching model comprises:

for the one or more content items:

determining, by an image encoder, an image embedding for image content of the content item;

determining, by a first text encoder, a first text embedding for textual content of the content item; and generating a combined embedding for the content item by combining the image embedding and the first text embedding;

for the collection of attributes, determining, by a second text encoder, a second text embedding for each attribute;

computing a similarity measure relating respective content item and attribute pairs; and assigning a particular attribute to a particular content item if the similarity measure satisfies a threshold value.

11. The system of claim 10, wherein training the content matching model comprises:

adding a weight value to one or more attributes based on a frequency of occurrence of the attribute in training data.

12. The system of claim 8, wherein generating a query comprises:

combining a specified number of attributes from the collection of attributes; and transforming, by a machine learning model, the combination of attributes into one or more queries.

13. The system of claim 8, wherein generating the collection of attributes comprises:

providing one or more content items of the collection of content items to the vision-language model that is trained to extract attributes across a specified set of domain specific categories.

14. The system of claim 13, further comprising:

filtering the extracted set of attributes before performing content matching, the filtering comprising one or more of frequency filtering or semantic deduplications.

15. One or more non-transitory computer storage media encoded with computer program instructions that when executed by one or more computers cause the one or more computers to perform operations comprising:

obtaining a collection of content items, one or more of the content items including an image and associated metadata;

generating a collection of attributes for one or more content items of the collection of content items by analyzing the image and the associated metadata, the generating including extracting attributes from one or more content items using a vision language model trained to generate structured attributes from content items and associated metadata;

assigning one or more attributes to one or more content items;

generating, using a machine learning model a plurality of queries as a model output from an input comprising the collection of attributes; and populating a plurality of collections of content items, one or more of the collections having a topic corresponding to one of the generated plurality of queries, wherein populating the collections comprises evaluating a relevance of query-content item pairs based on an overlap between attributes associated with the query and attributes assigned to the content item.

16. The one or more non-transitory computer storage media of claim 15, wherein content matching is used to assign the one or more attributes to the one or more content items, the content matching comprising:

learning one or more functions that map content items and attributes to a shared embedding space; and for the one or more content items, identifying relevant attributes for assignment to the content items by computing a similarity between the functions.

17. The one or more non-transitory computer storage media of claim 16, further comprising assigning the one or more attributes using a content matching model, wherein using the content matching model comprises:

for the one or more content items:

determining, by an image encoder, an image embedding for image content of the content item;

determining, by a first text encoder, a first text embedding for textual content of the content item; and generating a combined embedding for the content item by combining the image embedding and the first text embedding;

for the collection of attributes, determining, by a second text encoder, a second text embedding for each attribute;

computing a similarity measure relating respective content item and attribute pairs; and assigning a particular attribute to a particular content item if the similarity measure satisfies a threshold value.

18. The one or more non-transitory computer storage media of claim 17, wherein training the content matching model comprises:

adding a weight value to one or more attributes based on a frequency of occurrence of the attribute in training data.

19. The one or more non-transitory computer storage media of claim 15, wherein generating a query comprises:

combining a specified number of attributes from the collection of attributes; and transforming, by a machine learning model, the combination of attributes into one or more queries.

20. The one or more non-transitory computer storage media of claim 15, wherein generating the collection of attributes comprises:

providing one or more content items of the collection of content items to the vision-language model that is trained to extract attributes across a specified set of domain specific categories.

* * * * *